Figure 1:
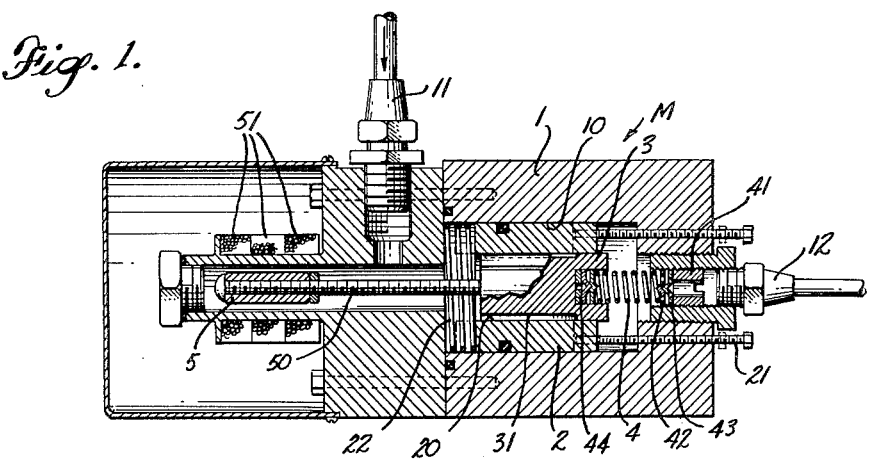

Aug. 28, 1962     R. E. OSGOOD     3,050,987
CONTAMINATION METER AND PROCESS FOR DETECTING CONTAMINATION
Filed Jan. 28, 1959

INVENTOR.
RICHARD E. OSGOOD
BY
Reynolds, Beach + Christensen
ATTORNEYS

3,050,987
CONTAMINATION METER AND PROCESS FOR DETECTING CONTAMINATION
Richard E. Osgood, Edmonds, Wash., assignor to Boeing Airplane Company, Seattle, Wash., a corporation of Delaware
Filed Jan. 28, 1959, Ser. No. 789,632
14 Claims. (Cl. 73—61)

Hydraulic systems such as are employed for actuating distant controls (using the latter term in a broad sense) in aircraft, missiles, and the like are extremely sensitive to hydraulic fluid contamination by the presence of physical particles. Such particles may be metal bits dislodged from the elements of the hydraulic system by wear or abrasion, or particles ground off rubber composition O-rings by movement under high pressure, or may come from the disintegration of filters, or may even be accidentally admitted to the system. They are usually extremely fine particles, often ranging from .000080 inch to .000120 inch, and a quantity as small as .5 mg. per 100 ml. (about as much as a heavily penciled period) has been found harmful in certain circumstances.

In particular servo valves have been found highly sensitive to such contamination. A sliding servo valve, because of the presence of contaminant in the clearance space between valve and bore wherein it slides, may fail to move the full distance it is designed to move under given conditions. A small metering orifice may fill partially with contaminant, and so will not operate as intended. Because functioning of the controls which are moved by such hydraulic systems is dependent upon exactly accurate movement or metering of such servo valves, any slightest departure from their intended degree of accuracy is likely to have a greatly magnified effect on the functioning of the system as a whole. It is highly necessary, therefore, that the presence of contaminants of such small particle sizes and even in the small quantities indicated be detected, so that remedial measures—for instance, replacement of contaminated fluid with uncontaminated—can be taken at once.

At the present time, the presence of such contaminants in such quantities can be determined only by lengthy laboratory tests performed by highly skilled technicians. For example, they can be filtered out by a previously weighed filter, and the filter is then weighed after drying, using the most delicate of scales. Such tests, while they may show the presence of contaminants, do not describe the nature or amount of contaminant in terms that would relate to the effect thereof on the system. For example, a test may show contaminants to be present, but it does not disclose the particle size of such contaminants. Contaminants of extremely small particle size may not, in a given hydraulic system, adversely affect the functioning of any part thereof, but in a different system or with contaminant particles of a different size in the same system, their presence would so affect the intended operation of the system as to render it in large degree inoperative, or at least incorrectly operative.

It is the object of the present invention to enable the measurement and analysis of contamination in such a hydraulic fluid system in a rapid and simple manner and by persons not highly skilled in laboratory techniques, so that it may be determined immediately and without the withdrawal of a sample from the system whether or not the contaminants present are such in quantity and in quality as will adversely affect operation of the system. This will enable disregarding contamination that will not adversely affect operation of the system, or the prompt detection of such as will. The present invention involves both a method of determining the degree and nature of such contamination and a device for determining the presence and nature of the contaminants in relation to a critical clearance in the system.

The invention is shown in the accompanying drawings in a rather diagrammatic fashion, and in relation to a typical element in a hydraulic system.

Figure 2:
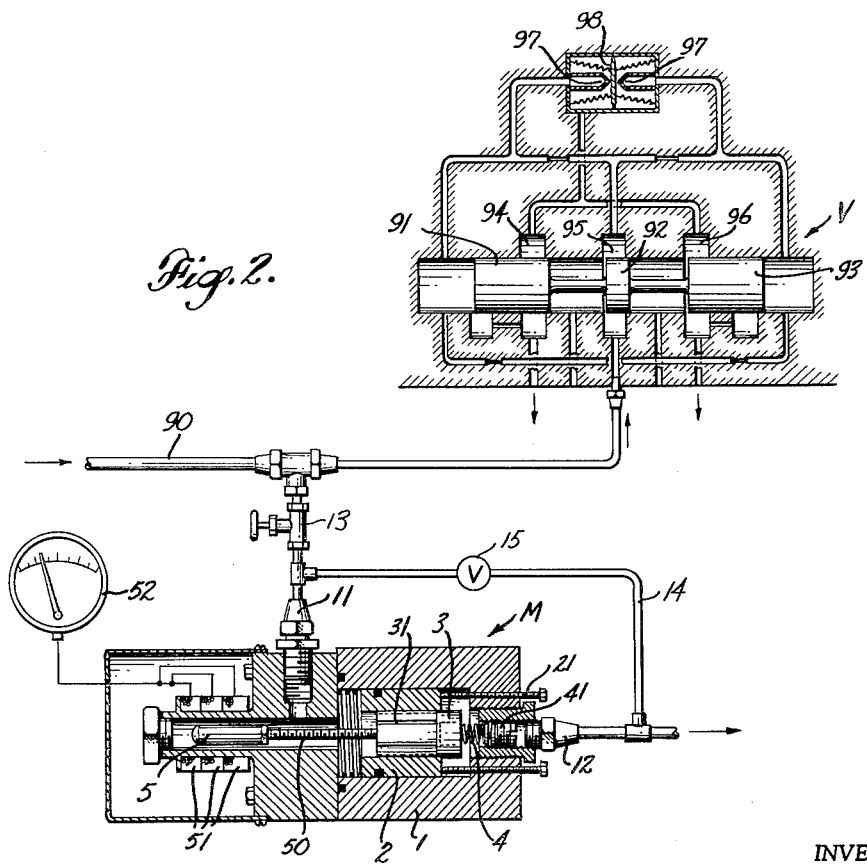

FIGURE 1 is an axial sectional elevation through the contamination meter, and FIGURE 2 is a similar view of the contamination meter showing the same connected to a typical control valve in a hydraulic system.

Briefly stated, the invention comprises establishing a flow path, actual or potential, for system fluid, usually in a normally blocked-off by-pass off the system fluid conduits, this flow path being established at the time of the test between two relatively displaceable surfaces which have a clearance between them that is equivalent to a critical clearance in the system. The system may have several different clearances and the determination, according to this invention, may be made with respect to that which is smallest or most critical, or with respect to each such different clearance. Having established the flow path, with a pressure difference through or across the same such as exists in the system, contaminants will flow into the clearance between the contamination meter surfaces to the same extent that they will flow into the critical clearance within the system itself. These surfaces are now displaced, whether manually, or by automatic actuation, or by the application of system pressure, is immaterial, the displacement being in opposition to a resisting force, normally one resiliently yieldable which, upon the destruction or cessation of the displacing force, tends to return the surfaces to their initial or neutral position from which they were displaced. If contamination is of such nature as would, in the critical system clearance, tend to impede the proper functioning of the system, it will likewise tend to prevent return of the relatively displaced meter surfaces to their neutral position. In other words, their return is resisted by friction of the interposed contaminants in the clearance space between the surfaces to the same extent that the contaminants will impede the movement of the surfaces having the equivalent clearance in the system itself. It then is a simple matter to measure, in any of various ways, the extent of failure of the surfaces to return to neutral position, and this becomes an indication of the contaminants' presence and nature. Time is not a critical factor in the determination, exposure to fluid flow through the meter of five to fifteen seconds showing little difference.

In FIGURE 2 of the drawings, the contamination meter, generally indicated by the letter M, is connected to a hydraulic system or conduit 90 by which fluid is delivered to a control valve generally indicated by the letter V and which is of the type shown in the patent to Lantz No. 2,836,154, dated May 27, 1958, this having two types of critical clearances and orifices, and so being selected merely as illustrative of various devices that might be thus protected by a contamination meter of the present invention. The servo valve V incorporates plunger elements 91, 92 and 93 which, in a closed position, cooperate with substantially zero lap with the respective annular ports 94, 95 and 96, 95 being the inlet port, and ports 94 and 96 being discharge ports. Movement of the valve 91, 92, 93 is under control of a highly sensitive pilot valve mechanism at 97, which includes minute ports interposed between and closable partially or alternatively by a resiliently mounted diaphragm 98. The presence of contaminants that would prevent the valve elements 91, 92 and 93 from closing with respect to their corresponding ports, or that would plug the orifices or the minute clearances which are part of the mechanism at 97, would prevent the intended operation of this servo valve V. As has been stated, this valve is chosen merely for purposes of illustration, and does not in itself constitute a part of this invention.

The contamination meter of this invention includes a housing 1 having an axial bore 10. A hollow cylindrical sleeve or liner 2 may be received therein, the bore 20 whereof constitutes a chamber within which is displaceable a plunger 3 in the form of a piston, having a guide section at the left and a clearance section at the right. The bore 20 of the cylinder 2 and the exterior of the clearance section of the piston 3 slide relatively to one another with a clearance that is the equivalent of the critical clearance in the system such as is to be protected by the given meter M. It is preferred that slots 31 be formed lengthwise of the piston, in the guide section, through which fluid is fed to the actual clearance space at its right end.

It may be noted here that it is immaterial that the piston is slidable in the axial direction. The movement could be arcuate, and the only requirement is that there be a clearance between the surfaces of the piston and the cylinder, or their equivalents, which clearance is equivalent to the clearance which is critical in the system element which is being protected. Also the clearance between 20 and 3 should be such as will establish a flow path across the piston and through the clearance space.

An inlet connection is provided at 11 to the casing 1 and to the bore 20 of cylinder 2 at the pressure end of the latter, whereby system fluid is admitted to the bore 20 and system pressure is applied to one end of the piston 3. A drain connection 12 is provided leading from the housing and cylinder at the opposite side of the piston. This drain leads to any convenient region of lower pressure than system pressure, and might return to the system itself in a region where the system pressure is less than the point to which the inlet 11 is connected. Resiliently yieldable means are provided, as indicated by the spring 4, reacting between the housing 1 and the piston, and tending to maintain the piston in one end of the cylinder in a given neutral position. Since a zero adjustment of the force of the spring 4 when the fluid is free from contaminant is desirable, an axially bored plug 41 is provided, threaded within the connection to which the drain connection 12 is connected. By these or any equivalent means the initial force of the spring may be regulated when system pressure is not applied to the opposite end of the piston. When system pressure is applied, however, the piston will be displaced, due to the pressure difference through the clearance space between piston and cylinder, and the spring 4 will be compressed.

A means is provided, when a reading is desired, for admitting system pressure to the meter M, and then for neutralizing the resulting pressure drop across the piston 3. This may be accomplished in various ways, as, for example, by the opening and closing of a valve 13 (FIGURE 2) interposed between the system conduit 90 and the inlet conection 11. This valve is opened to initiate a test, and when this valve is closed, system pressure no longer acts on the piston 3 to move it to the right, and the resilient force of the spring 4 urges the piston to the left, and it will return to or towards its neutral position, the extent of its movement depending upon the presence and nature of contaminants in the clearance space between 3 and 20. For rapid operation of the meter a pressure-equalizing duct 14 is provided between the ends of the cylinder 2, controlled by a normally closed valve 15. If the piston fails to return to its neutral position after pressure has been equalized between the ends of the cylinder, contaminants are known to be present, and if the return movement is short by a measured or critical amount, it will be known that the contamination is of the type which will interfere with system operation, and the hydraulic fluid should no longer be used. A similar result, namely, destruction of the displacing force on the piston 3, might be effected by closure of the drain at 12, for while this would leave system pressure still active upon the piston to displace it, opening of equalizing valve 15 would still leave the piston subject only to spring force and the resistance of collected contaminants, and its movement would be an index of the amount and nature of the contaminants. Furthermore, while system pressure is utilized as the force to displace the piston, in addition to the system pressure establishing the leakage path through the clearance between piston and cylinder, the displacing force might be other than a hydraulic force. For example, a magnetic force might be applied to the plunger or piston to displace it in opposition to the spring force, leaving it to the spring force to return it upon removal of the magnetic force, or the displacing force might be manually applied.

The extent of return of the plunger to its neutral position is measurable by the extent of failure of the plunger to return to its neutral position, but unless the user only needs to know of the presence or absence of contaminants, there must be a ready indication of this measurement in order to determine the presence and nature of the contaminants in relation to the critical clearance of the system. This may be done in a variety of ways, optically, electrically, etc. As herein shown, a core 5 of magnetic material is supported from and for movement with the piston 3, as for example by a nonmagnetic stem 50 extending axially from the piston to a distant point, and by surrounding this core with a linear variable differential transformer or similar element, the coils whereof are illustrated at 51, when the core 5 is in the position corresponding to the neutral position of the plunger or piston 3 the core is symmetrically centered with respect to the transformer windings 51. If the core does not return to this centered position, a suitable indicator 52, diagrammatically shown, connected to the core windings 51, will indicate this fact and the extent of failure to return to neutral position. Again while this is a convenient sensing device and way of indicating the extent of failure of movement of the piston, any suitable means to the same ends may be employed.

Provision is made for clearing the meter of contaminant, so that a later measurement is not affected by an accumulation from previous tests. Preferably this is done by increasing the clearance past the metering surfaces, and allowing increased fluid flow to flush such surfaces, washing from them the collected particles and carrying them off to a drain. For example, the liner 2 is shiftable axially, to the left, within the bore 10, by displacing screws 21 or like means, until in its dashline position of FIGURE 1 its right end clears the metering portion of the piston 3. System pressure now flushes from the metering surfaces any collected contaminants, into the drain at 12. The liner 2 is returned to its initial position, as by the spring 22 upon withdrawing the screws 21. Provision might be made for counterflow flushing to clean the meter, but the arrangement described is preferred.

Such an arrangement for flushing has the advantage that it does not disturb the zero adjustment of the meter. Further to that end, the piston return spring 4 is so supported at its ends that turning of the zero adjustment plug 41 will create no tendency for the spring to wind up and so change its force. Thus, by way of example, the spring is seated at one end at least, or at both ends, upon a washer 42 having a center point bearing upon a washer 43, the latter bearing upon the inner end of adjusting plug 41 or upon a hardened washer 44 within a recess in the end of the piston 3.

It is believed that the manner of operating the device and the performing of the method will be readily understood. The meter M is connected to the system conduit 90 in the vicinity of the device V which is to be protected. If desired, several such meters may be connected at various points in the system to protect various different system components. Normally the valves 13 and 15 will be closed, and the valve 13 will be opened momentarily for a test. System pressure, gaining access to the interior of the meter at 11, will urge the piston 3 to the right, in opposition to the spring 4. System fluid will pass through the slots 31, and will enter or leak through the clearance between the piston 3 and cylinder bore 20, and to drain at 12, and any contaminants in the system conduit 90 that might adversely affect the operation of the protected device V will find their way into the equivalent clearance space between 3 and 20. The valve 13 is then closed, and the pressure difference across the piston is destroyed, as by opening valve 15. The piston, under the influence of the spring 4, will return to or toward its neutral position, as will the core 5. If the contaminants are present in such quantity, or of such particle size, as will tend to cause the piston to stick and fail to return to its neutral position, this fact and the distance by which it fails to return will be indicated promptly in the indicator 52. The test having been conducted, the liner 2 is displaced to the left, the meter is flushed out and parts restored to their initial positions. If the test has indicated the necessity for changing the system fluid, this is done.

I claim as my invention:

1. A device for measuring physical contamination present in a hydraulic fluid such as is employed in control systems or the like, comprising a chamber for connection in such a system and a piston fitted within said chamber with clearance equivalent to a critical clearance in the system, and displaceable therein from a neutral position by application of a displacing force, whereby there is established a path for flow of system fluid otherwise than through such clearance between piston and chamber, resiliently yieldable means opposing displacement of the piston and operable to return the piston to or towards such neutral position upon removal of the displacing force, and to close such flow path and to confine flow to such clearance, whereby the piston's return to neutral position is resisted by any contaminant material deposited within the clearance between piston and chamber, means to apply a displacing force to the piston to first open such flow path, and to remove such force, to then close the flow path, and means to sense and to indicate the extent of the piston's failure to return to neutral position, following its displacement and the removal of the displacing force.

2. A device as in claim 1, the sensing and indicating means including means operatively connected to the piston for actuation by movement of the latter, a sensing device arranged for actuation in accordance with actuation of said movement-actuated means, and an indicating device controlled by said sensing device.

3. A device for measuring physical contamination present in a pressurized hydraulic fluid or the like, such as is employed in control systems or similarly critical installations, comprising a chamber having an inlet connection for admitting fluid under pressure from the system, a piston fitted within said chamber with a small clearance equivalent to a critical clearance in the system, and displaceable therein from a neutral position by application of a displacing force, said chamber having an outlet connection to a region of pressure lower than system pressure leading from the chamber at the side of the piston opposite the side to which the inlet connection admits, whereby there is established a flow path for system fluid through the clearance between piston and cylinder, means opposing displacement of the piston from and operable with a substantially constant force to return the piston, following its displacement, to or towards such neutral position upon removal of the displacing force, except to the extent its return is resisted by contaminant material accumulated within the clearance between piston and chamber, means to control access of system pressure through said inlet connection, thereby to create the displacing force, and to establish fluid flow through the clearance between piston and chamber because of the pressure drop across such clearance, means to destroy such pressure drop, to leave the piston subject only to the force of the displacement-opposing force as resisted by any accumulation of contaminant material in the clearance, for its return to neutral position, and means to sense and to indicate the extent of the piston's failure to return to neutral position, following its displacement and the removal of the displacing force.

4. A device as in claim 3, including valve means in one of the connections to the chamber, movable between open and closed positions to establish or to destroy the pressure difference across the piston.

5. A device as in claim 4, including a by-pass passage interconnecting the ends of the chamber, and a normally closed valve in said by-pass passage, for equalizing pressure at the opposite ends of the piston, when opened, leaving said piston and resilient means active upon said piston and tending to return it to its initial position upon equalization of pressure, and constituting the displacement opposing means.

6. A device as in claim 3, including a valve means in one of the connections to the chamber, and normally open for fluid flow through the clearance, but closable to enable equalization of pressure between the chambers at the opposite sides of the piston through such clearance.

7. A device as in claim 3, wherein a cylinder and a piston axially reciprocable therein constitute the chamber and the piston, respectively, said inlet connection and said outlet connection being at respectively opposite sides of the piston.

8. A device as in claim 5, including an adjusting plug threaded in the drain connection and apertured in the axial direction for flow through, and a compression spring intermediate said adjusting plug and the piston, constituting the yieldable means, and adjustable for varying the spring force to determine the zero or neutral position of the piston.

9. A device as in claim 8, including means at one end, at least, of the spring, for free-rotative one-point support thereof.

10. A device for measuring physical contamination present in a hydraulic fluid employed in control systems or the like, comprising a casing having an axial bore, a cylinder open at both ends and removably received and sealed therein, a piston reciprocable within said cylinder, with a clearance equivalent to a critical clearance in the system, an inlet connection from the system to the casing and to the cylinder at one end, and a drain connection from the casing and cylinder at the casing's opposite end, whereby system pressure creates a pressure difference across the piston tending to displace the piston from a given neutral position, spring means operatively connected to said piston to resist such displacement and tending to return the piston to its neutral position upon relief from system pressure, means to adjust the spring force to adjust the zero or neutral position of the piston, a stem projecting from the piston, a magnetic core carried by said stem distant from the piston, transformer windings surrounding and symmetrically centered with respect to said core in its position that corresponds to the neutral position of the piston, indicating means operatively connected to the transformer windings to indicate the extent of failure of the piston to return to its neutral position and the core to return to its centered position, and means to destroy any pressure difference across the piston, to allow its spring-urged return to or towards neutral position.

11. A device as in claim 3, including a hollow liner reciprocably mounted within said chamber, and a piston fitted with the prescribed clearance for axial sliding movement in said liner, the displacement-opposing means including a compression spring bearing upon one end of the piston, axially adjustable means whereon the opposite end of the piston bears, for zeroing, and means to shift said liner axially relative to said piston, for flushing of accumulated contaminants from the clearance surfaces of liner and piston, and for return of the liner to its initial position independently of the spring-adjusting zeroing means.

12. A method for indicating the presence of physical contaminants suspended in a hydraulic fluid such as is used in control systems or the like, which comprises establishing an actual or potential flow path for system fluid between two relatively displaceable surfaces which have a clearance such as will produce a given pressure difference to flow between its opposite sides, and equivalent to a critical clearance in the system, applying a substantially constant force between such surfaces resisting their relative displacement from and urging their return to a neutral position, applying a displacing force between such surfaces in opposition to the displacement-resisting force, neutralizing the displacing force to leave the surfaces free to return by such resilient force to their neutral position except as such return is resisted by contaminants interposed in the clearance between them, and measuring the extent of failure of the surfaces to return to neutral position as a measure of the contaminants present.

13. A method as in claim 12, wherein the pressure difference across the clearance between the surfaces creates the displacing force, and the neutralization thereof is accomplished by equalization of pressure across such clearance.

14. A device for indicating the presence in a hydraulic fluid system of physical contamination incompatible with correct functioning of system components which have a critical clearance between them, said device comprising a chamber arranged for connection at one point with such system and at another point with a lower pressure region, a piston fitted within said chamber with clearance equivalent to such critical clearance, and displaceable therein from a neutral position, resiliently yieldable means opposing such displacement and operable to return the piston to its neutral position upon removal of a displacing force, except as and to the extent that such return may be resisted by the presence of contaminants in the clearance between piston and chamber, means to apply and then to remove a displacing force to the piston in opposition to said resiliently yieldable means, while the chamber is in communication with system fluid under normal pressure between its two points of connection, and means to indicate failure of the piston to return to its neutral position following removal of the displacing force.

References Cited in the file of this patent

UNITED STATES PATENTS

| | | |
|---|---|---|
| 2,040,042 | Eckstein | May 5, 1936 |
| 2,761,317 | Seagrave | Sept. 4, 1956 |
| 2,843,077 | Leefer | July 15, 1958 |

UNITED STATES PATENT OFFICE
CERTIFICATE OF CORRECTION

Patent No. 3,050,987                                  August 28, 1962

Richard E. Osgood

It is hereby certified that error appears in the above numbered patent requiring correction and that the said Letters Patent should read as corrected below.

Column 6, line 13, strike out "and"; line 16, strike out "leaving said piston".

Signed and sealed this 15th day of January 1963.

(SEAL)
Attest:

ERNEST W. SWIDER
Attesting Officer

DAVID L. LADD
Commissioner of Patents